(12) United States Patent
Zheng et al.

(10) Patent No.: US 11,057,192 B2
(45) Date of Patent: Jul. 6, 2021

(54) METHOD AND APPARATUS FOR GENERATING A COVER IMAGE FOR STEGANOGRAPHY

(71) Applicant: AGENCY FOR SCIENCE, TECHNOLOGY AND RESEARCH, Singapore (SG)

(72) Inventors: Lilei Zheng, Singapore (SG); Ying Zhang, Singapore (SG); Vrizlynn Ling Ling Thing, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 153 days.

(21) Appl. No.: 16/482,703

(22) PCT Filed: Jan. 31, 2018

(86) PCT No.: PCT/IB2018/000144
§ 371 (c)(1),
(2) Date: Jul. 31, 2019

(87) PCT Pub. No.: WO2018/142216
PCT Pub. Date: Aug. 9, 2018

(65) Prior Publication Data
US 2019/0356476 A1    Nov. 21, 2019

(30) Foreign Application Priority Data
Jan. 31, 2017   (SG) ............................. 10201700761R

(51) Int. Cl.
*H04L 9/00*   (2006.01)
*H04L 9/06*   (2006.01)
(Continued)

(52) U.S. Cl.
CPC ............. *H04L 9/0662* (2013.01); *H04K 1/02* (2013.01)

(58) Field of Classification Search
CPC ........... H04K 1/02; H04K 1/06; H04L 9/0662
See application file for complete search history.

(56) References Cited

U.S. PATENT DOCUMENTS 8,224,017 B2 *   7/2012   Shi ..................... H04N 1/32149
                                                          382/100
2006/0120558 A1 *   6/2006   Shi ....................... H04N 1/3217
                                                          382/100
(Continued)

FOREIGN PATENT DOCUMENTS

IN   2471/MUM/2015 A   3/2015
WO       0025203       5/2000

OTHER PUBLICATIONS

Patel, et al., "Binary Image Steganography in Wavelet Domain," 2015 International Conference on Industrial Instrumentation and Control, May 28-30, 2015, 6 pages, College of Engineering Pune, India.

(Continued)

*Primary Examiner* — Gary S Gracia
(74) *Attorney, Agent, or Firm* — Womble Bond Dickinson (US) LLP

(57) ABSTRACT

A method and an apparatus for generating cover images for steganography are provided. The steganographic framework is designed based on an image generation system. The apparatus may encode a message to obtain a binary sequence. The apparatus may obtain a plurality of binary segments of a particular length based on the binary sequence. For each binary segment of the plurality of binary segments, the apparatus may select an image of a semantic content (e.g., a numeral digit) from a dictionary of images of random semantic contents (e.g., random numeral digits)

(Continued)

based on the binary segment. The apparatus may combine the selected images to form at least a portion of a cover image denoting a combination of the semantic contents of the selected images (e.g., a plurality of numeral digits).

20 Claims, 14 Drawing Sheets

(51) Int. Cl.
*H04K 1/02* (2006.01)
*H04K 1/00* (2006.01)

(56) References Cited

U.S. PATENT DOCUMENTS

| | | | |
|---|---|---|---|
| 2006/0176299 A1* | 8/2006 | Subbalakshmi | G06T 1/0064 345/421 |
| 2006/0257018 A1* | 11/2006 | Shi | G06T 1/0028 382/159 |
| 2008/0130883 A1* | 6/2008 | Agaian | G09C 5/00 380/54 |
| 2008/0175429 A1* | 7/2008 | Shi | G06T 1/005 382/100 |
| 2010/0091981 A1* | 4/2010 | Shi | G06T 1/0028 380/28 |
| 2011/0055585 A1* | 3/2011 | Lee | H04L 9/0844 713/183 |
| 2011/0206350 A1* | 8/2011 | Cheng | G06T 1/0021 386/260 |
| 2011/0228943 A1* | 9/2011 | Amirtharajan | H04K 1/06 380/287 |
| 2012/0163655 A1* | 6/2012 | Tanaka | H04N 19/467 382/100 |
| 2013/0019106 A1 | 1/2013 | Fischer | |
| 2014/0341374 A1* | 11/2014 | Thozhuvanoor | H04L 9/0869 380/28 |
| 2016/0085955 A1* | 3/2016 | Lerner | G06F 21/725 726/20 |
| 2018/0082024 A1* | 3/2018 | Curbera | G06F 21/00 |

OTHER PUBLICATIONS

The International Preliminary Report on Patentability for PCT Application No. PCT/IB2018/000144 dated Aug. 6, 2019, 5 pages.
The International Search Report for PCT Application No. PCT/IB2018000144 dated Jun. 20, 2018, 2 pages.
The Written Opinion of the International Searching Authority for PCT Application No. PCT/IB2018/000144 dated Jun. 20, 2018, 4 pages.

\* cited by examiner

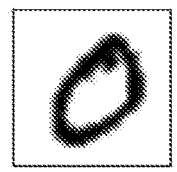 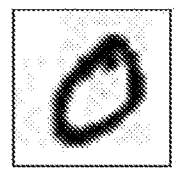 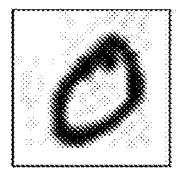
(a) Original  (b) Quality 75%  (c) Quality 75%
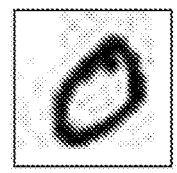 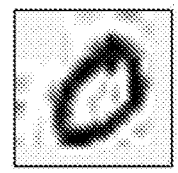
(d) Quality 25%  (e) Quality 5%
FIG. 7A
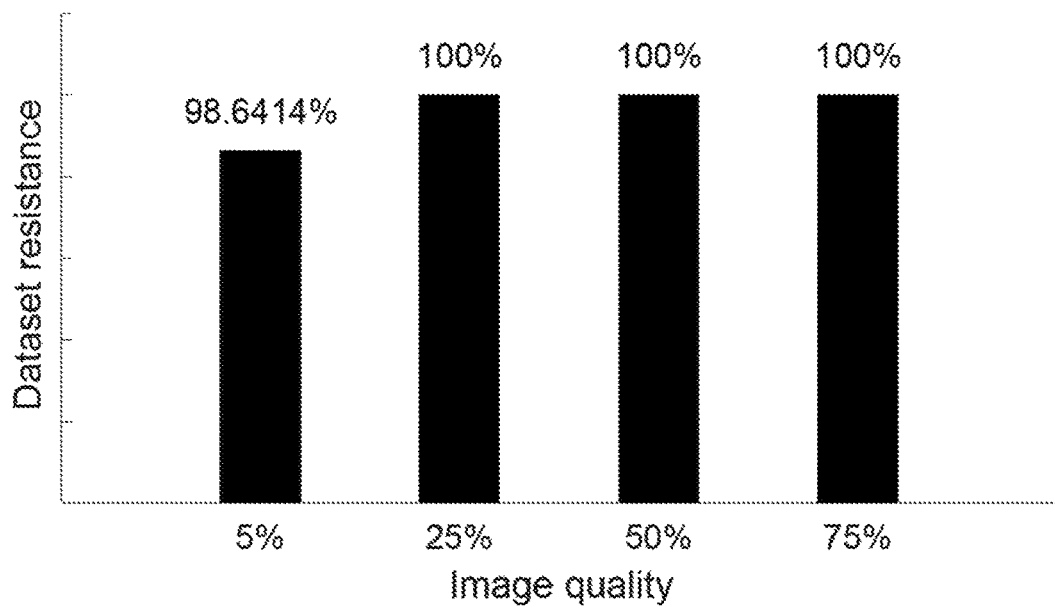
FIG. 7B

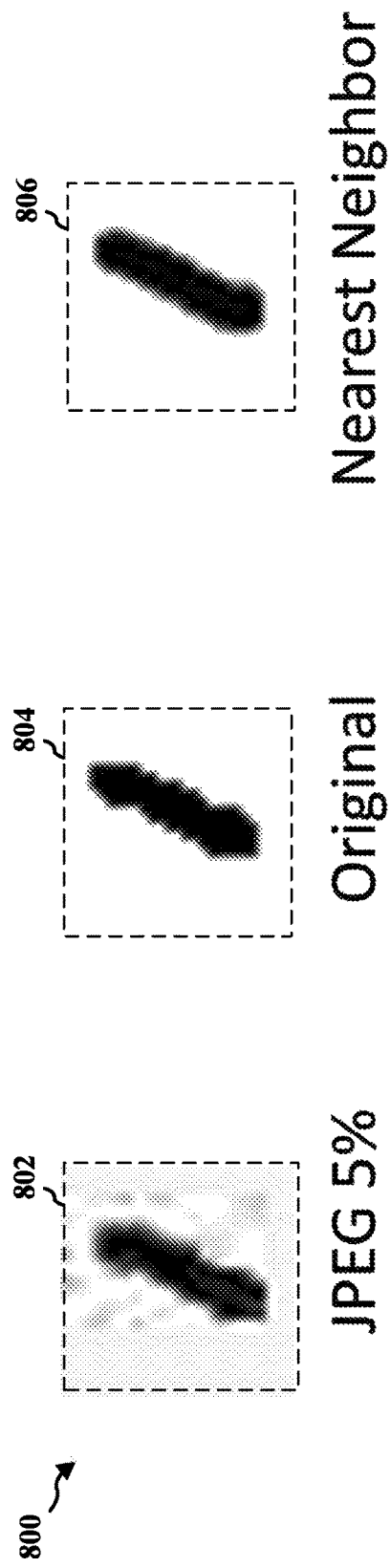
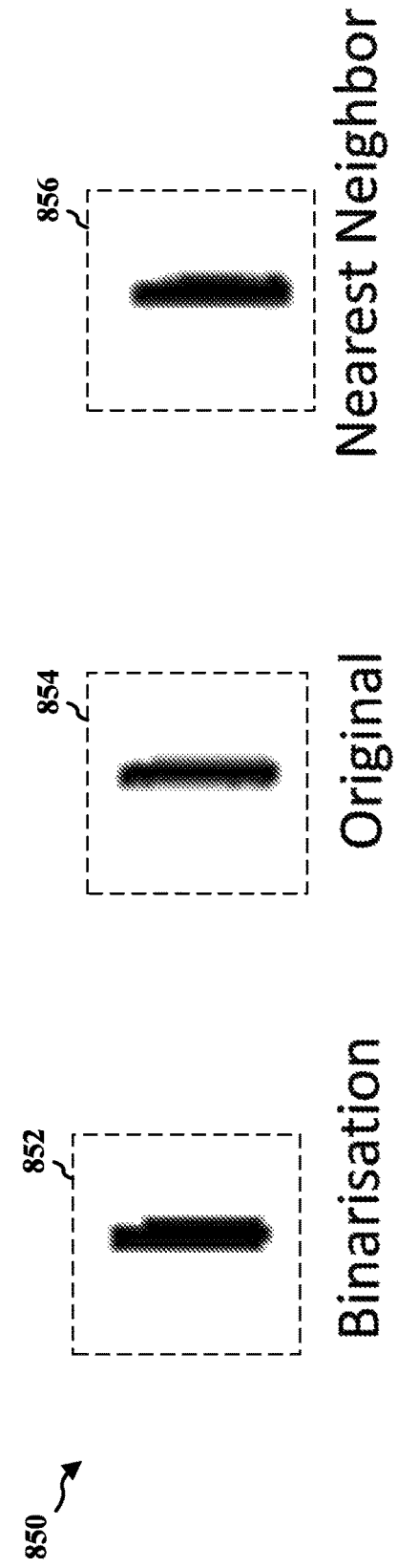
FIG. 8A
FIG. 8B

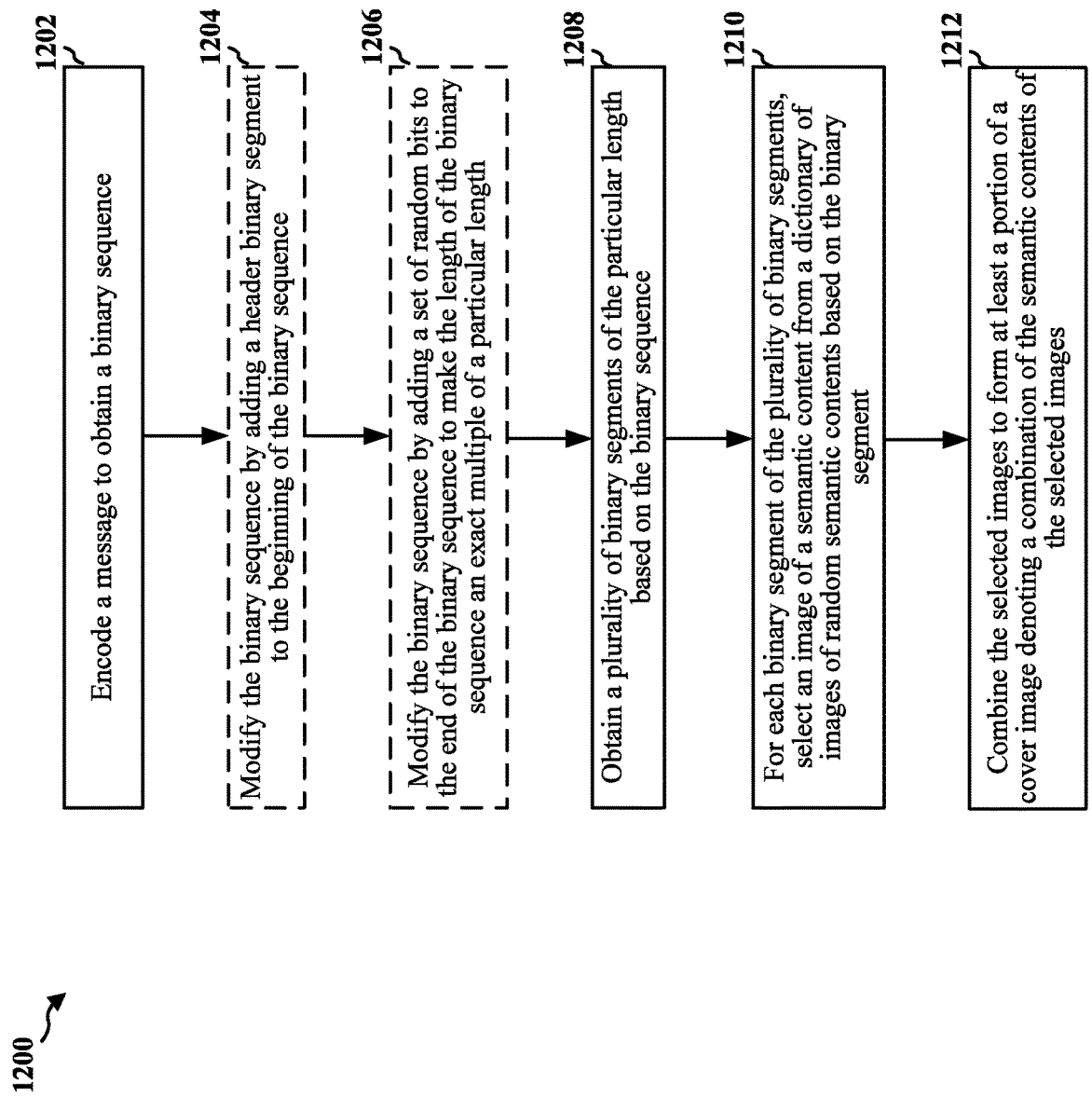

METHOD AND APPARATUS FOR GENERATING A COVER IMAGE FOR STEGANOGRAPHY

CROSS-REFERENCE TO RELATED APPLICATION(S)

This patent application is a U.S. National Phase Application under 35 U.S.C. § 371 of International Application No. PCT/IB2018/000144, filed on Jan. 31, 2018, entitled METHOD AND APPARATUS FOR GENERATING A COVER IMAGE FOR STEGANOGRAPHY, which claims the benefit of priority of Singapore Patent Application No. 10201700761R, entitled "A Method for Generating a Cover Image for Steganography" and filed on Jan. 31, 2017, which was expressly incorporated by reference herein in its entirety.

TECHNICAL FIELD

Various aspects of this disclosure generally relate to steganography, and more particularly, to generating cover images for steganography.

BACKGROUND

Protecting information in transmission is always needed to ensure the confidentiality from unintended recipients. To achieve this goal, two conventional approaches have been developed: cryptography and steganography. Cryptography aims to convert a secret message into unreadable information stream, referred as ciphertext. Steganography conceals a secret message within another meaningful information medium as the cover, known as stego-cover. For example, steganography may be used for digital watermarking in which a message (e.g., an identifier) is hidden in an image so that its source can be tracked or verified (e.g., to prevent copyright infringement). While cryptography ensures the security of the secret message by making the ciphertext hard to decrypt, steganography protects the secret message by making the stego-cover innocuous, i.e., as ordinary as those carrying no secret.

It is possible to combine both approaches to increase the security of information by first encrypting the secret message by cryptography methods; and then hiding the obtained ciphertext within a cover by steganography methods. Comparing the two, cryptography is a more thoroughly researched discipline. High quality cryptography techniques such as RSA (known as public-key cryptography standards) have been widely used in practice. In the context of multimedia applications, a steganographic cover can be any kind of medium such as text, image, audio, and video. For this reason, one can divide current steganography methods as text steganography, image steganography, audio steganography and video steganography. The main idea in most current steganography methods is replacing useless data in a given cover by the secret information. Specifically, components of a certain file are regarded useless when they play a less important role in delivering concerned information than the principal part. The definition of uselessness usually depends on the limitations of the human auditory or visual systems: modifying the useless data would cause no awareness of an observer. With respect to the entire cover, the modification is therefore relatively small to hide the secrecy, e.g., shifting lines and words in a text document; replacing the least significant bits (LSB) of discrete cosine transform (DCT) coefficient values in an image or an H.264 Video; manipulating selected phase components in an audio. However, these slight changes to the original cover are usually imperceptible for a human observer. It is possible to identify these slight changes with the assistance of statistical examination algorithms. Such algorithms are referred to as steganalysis.

Modifying a given cover always leaves evidence that is detectable especially when the original cover is available for comparison. Keeping the original cover private may help to protect the existence of modification but this privacy cannot be assumed because it violates the Kerckhoffs' principle: except the key, the data and the algorithms are not guaranteed to be unknown to the observer. In practice, both sender and receiver should destroy all covers they have already used for confidential information transmission. Another interesting solution is directly generating a cover for a given secret message. In this case, the cover is the stego-cover and the generating procedure leaves no detectable modification evidence. The challenge for steganography is to make the cover as normal as other existing objects. For example, a generated text should be as natural as the human compilations; otherwise, its unintelligible content would arouse suspicion.

SUMMARY

The following presents a simplified summary in order to provide a basic understanding of various aspects of the disclosed invention. This summary is not an extensive overview of all contemplated aspects, and is intended to neither identify key or critical elements of all aspects nor delineate the scope of any or all aspects. The sole purpose is to present some concepts of one or more aspects in a simplified form as a prelude to the more detailed description that is presented later.

This disclosure describes a method and an apparatus for generating cover images for steganography, where a steganographic framework is designed based on an image generation system. The use of the image generation system for an unintended and probably innocent purpose can form a shelter for hiding the occurrence of steganography.

Specifically, a dictionary-based encoding scheme using images of a public dataset, for example, a handwritten digit dataset is provided. In this dataset, thousands of images carry the same digit but have variance in their shapes and pixel depth. This high semantic redundancy offers high capacity to hide information. Extensive experiments have demonstrated that since it works on semantic content of images rather than on low-level features such as image pixels, the described system holds considerable resistance to image processing operations like JPEG compression, image binarization, image scaling and image noise. For example, when traditional methods are vulnerable to slight transmission loss due to double compression using different quantization tables, the described method is robust to heavy transmission loss such as Gaussian white noise or salt-and-pepper noise.

In one aspect of the disclosure, a method, a computer-readable medium, and an apparatus for generating a cover image for hiding a message are provided. The apparatus may encode the message to obtain a binary sequence. The apparatus may obtain a plurality of binary segments of a particular length based on the binary sequence. For each binary segment of the plurality of binary segments, the apparatus may select an image of a semantic content from a dictionary of images of random semantic contents based on the binary segment. The apparatus may combine the selected images to form at least a portion of the cover image denoting a combination of the semantic contents of the selected images.

To the accomplishment of the foregoing and related ends, the aspects disclosed include the features hereinafter fully described and particularly pointed out in the claims. The following description and the annexed drawings set forth in detail illustrate certain features of the aspects of the disclosure. These features are indicative, however, of but a few of the various ways in which the principles of various aspects may be employed, and this description is intended to include all such aspects and their equivalents.

BRIEF DESCRIPTION OF THE DRAWINGS

FIG. 2 is a diagram illustrating examples of randomly picked images from the MNIST dataset.

FIG. 4 is a diagram illustrating an example of adding random digits into the cover image describe above in FIG. 3 to produce a richer cover image.

FIG. 7A is a diagram illustrating an example of compressed images with different JPEG compression quality.

FIG. 7B is a chart summarizing the resistance of the MNIST dataset to JPEG compression.

FIG. 8A is a diagram illustrating an example of an image losing its resistance to compression.

FIG. 8B is a diagram illustrating an example of value change due to image binarization.

FIG. 12 is a flowchart of a method of generating a cover image for hiding a message.

DETAILED DESCRIPTION

Figure 1:
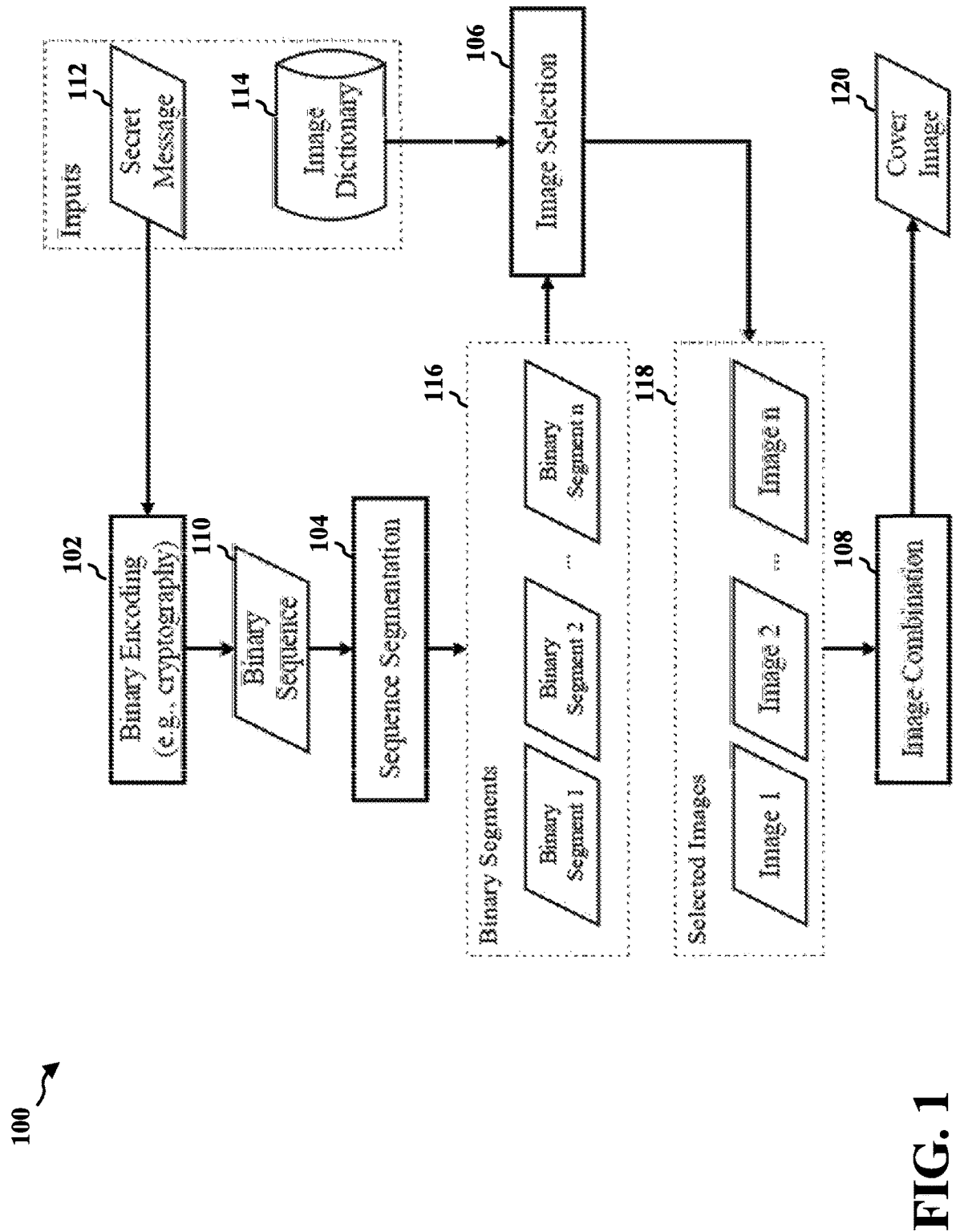
FIG. 1 shows a flowchart of a cover image generation system of some embodiments.

The detailed description set forth below in connection with the appended drawings is intended as a description of various possible configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of generating a cover image for steganography will now be presented with reference to various apparatus and methods. The apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Some embodiments of the disclosure target an existing medium generation system and design an encoding scheme within the generating procedure. Human language system is the most common generation system; thereby the existence of natural human language is the most proper shelter for hiding the occurrence of steganography.

The security of a pure steganography system is vulnerable since an observer can obtain the system to decode any text that has been collected. Regardless if the observer cannot visibly distinguish a generated stego-text from a harmless text, the observer may identify the existence of secrecy when the hidden message is shown after decoding. However, this problem may be avoided by prior cryptography that encrypts the hidden message as ciphertext of random appearance. Thereby when the observer only gets a random numerical sequence after decoding, it is difficult for the observer to confirm the existence of secrecy. In other words, for such a combined system, cryptography provides two layers of security: (1) helping the steganography system to conceal the existence of secrecy; (2) protecting the content of the hidden message from being decrypted. For this reason, there is a need for a steganography system that can avoid any suspicion relying on decoding the cover.

The objective of some embodiments of the disclosure is to render generated stego-covers unnoticeable to conceal the existence of steganography. These embodiments aim to extend the use of cover generation in linguistic steganography to image steganography. Based on a publicly available image dataset, dictionaries of high semantic redundancy may be generated to produce innocuous images for information hiding. While cryptography techniques protect a secret message by transforming its semantic patterns to meaningless patterns of random appearance, the semantic steganography performed by some embodiments generates new innocuous semantic patterns to cover the confidential semantic patterns.

This disclosure presents a cover generation system for image steganography. In some embodiments, an image generation system uses the MNIST (Modified National Institute of Standards and Technology) handwritten digit dataset as the base. The generated images are well established and recognized. In some embodiments, images of the dataset are selected to establish a digit-image dictionary, which is utilized as a codebook to associate each image with a binary code (also referred to as binary segment).

FIG. 1 shows a flowchart 100 of a cover image generation system of some embodiments. At 102, a secret message 112 may be encoded (e.g., via cryptography) into a binary sequence 110. The operations performed at 102 may be referred to as binary encoding. At 104, the binary sequence 110 may be broken into binary segments 116 of fixed length (e.g., 16 bits). The operations performed at 104 may be referred to as sequence segmentation. At 106, for each binary segment of the binary segments 116, a corresponding digit image may be selected according to the image dictionary 114. The operations performed at 106 may be referred to as image selection. At 108, the selected digit images 118 may be spliced into a single picture, i.e., the cover image 120. The operations performed at 108 may be referred to as image combination. In some embodiments, all the digit images in the image dictionary 114 have the same background so that their edges will naturally merge when splicing and the generated cover image 120 looks innocuous. The intention of using the MNIST dataset for steganography is hidden behind the possibility of using it for other purposes. Moreover, compared with traditional image steganography techniques manipulated pixel values in spatial domain or coefficients in transform domains, the dictionary-based encoding scheme of some embodiments concerns semantic objects, i.e., the whole image of a digit. As a result, some embodiments may be resistant to probable transmission loss.

Figure 2:
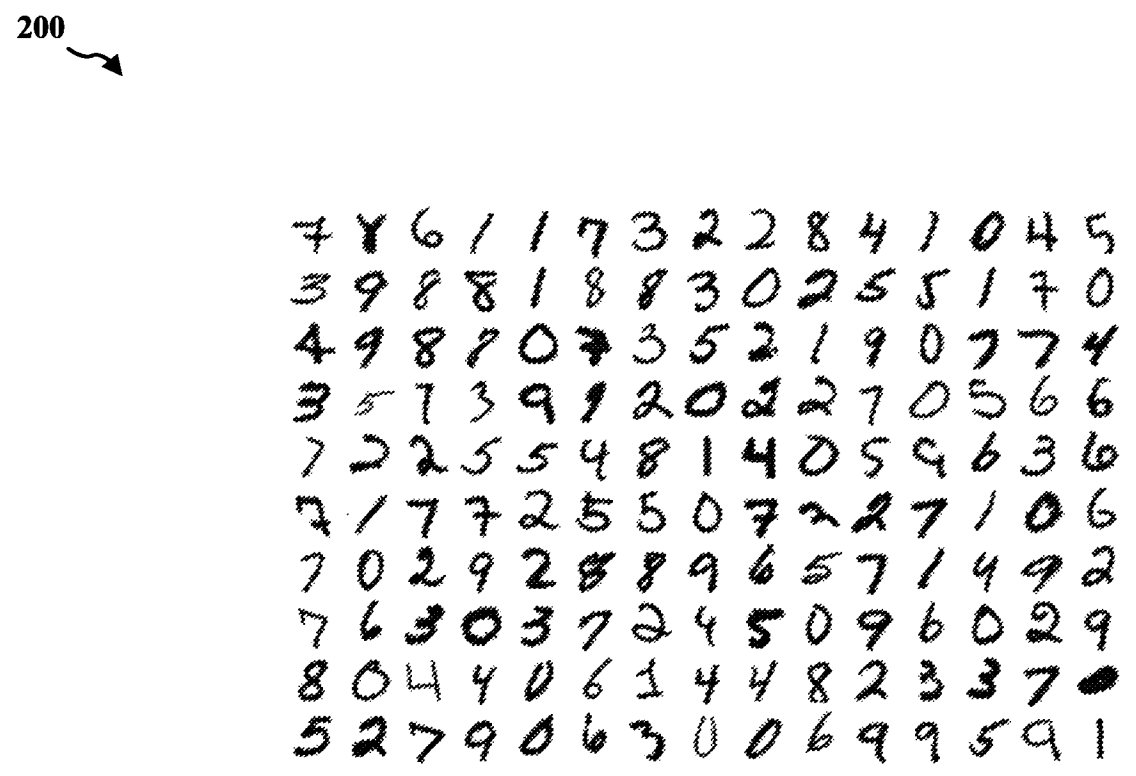

The systematic view of generating a cover image is given in FIG. 1. An encoding process that relies on a large dictionary of images is provided. In one example, images of digits in a MNIST dataset is used to design the dictionary of images. The MNIST handwritten digits dataset is a popular benchmark for image classification. The original handwritten digits were collected among Census Bureau employees and high school students. There are 70,000 8-bit grayscale images in total, capturing a digit from 0 to 9 in various writing styles. The digits have been size-normalized and centered in images of a fixed size 28×28. That means all the digit images of the MNIST dataset are computer-processed. FIG. 2 is a diagram 200 illustrating examples of randomly picked images from the MNIST dataset.

A private dictionary (or codebook) may be built with these publicly available images to associate each image with a unique binary code. Considering the size of the MNIST dataset is 70,000, the index of each image can denote a binary code of length at most 16 ($=\lfloor\log_2(70000)\rfloor$), or known as a fixed-length binary code as a binary segment. Conversely, all possible binary segments of length 16 represent 65,536 ($=2^{16}$) different images. The 70,000 images are permutated in the dataset, and a dictionary may be established with 65,536 images, e.g., the first 65,536 images. The permutation may depend on a specified key, with which the receiver can repeat the permutation. The security of this key guarantees the privacy of the dictionary. It may be difficult to know the image order in the dictionary without the key.

The following example illustrates the procedure of cover generation by hiding a simple message "TIFS". Given a secret message, encode it into a binary sequence. The encoding can be carried out by advanced cryptography techniques to randomize the binary sequence and thus enhance the security. To illustrate steganography without loss of generality, a simple encoding scheme, the ASCII encoding standard, is employed in the example to transform the given text "TIFS" to a 32-bit sequence.

| Type | No. of units | Data |
|---|---|---|
| Characters | 4 | "TIFS" |
| ASCII | 4 | 84 73 70 83 |
| Byte | 4 | 01010100 01001001 01000110 01010011 |
| Bit | 32 | 01010100010010010100011001010011 |

To make sure that the binary sequence can be recovered by the receiver, there may be a need to embed the sequence length into the sequence itself. For the current example, a 10-bit header may be added (i.e., 0000100000 for 32) to the 32-bit sequence, resulting in a 42-bit new sequence. Restricted by the size of the dictionary, the length of binary segments is set to its maximum, i.e., 16. Consequently, there is a need to add random bits to the sequence tail to ensure the final length is an exact multiple of 16. The lengths of the binary segment, the head and the tail are adjustable and independent of image quality. An example of adding header and tail, and corresponding binary sequence segmentation is illustrated below.

| Process | Binary sequence |
|---|---|
| Original | 01010100010010010100011001010011 |
| Add head | 000010000001010100010010010100011001010011 |
| Add tail | 000010000001010100010010010100011001010011011001 |
| Segment | 0000100000010101 0001001001010001 1001010011011001 |

Figure 3:
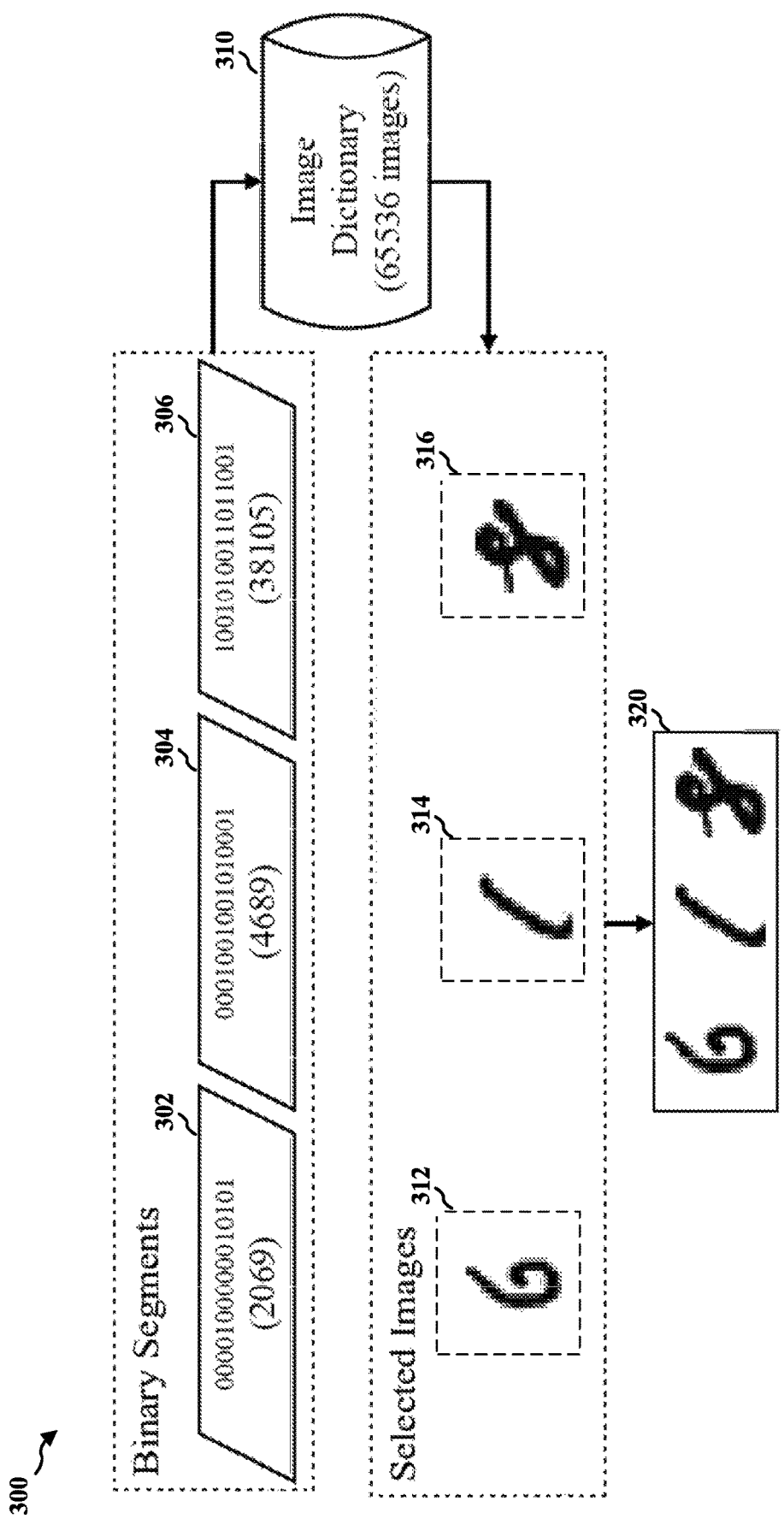
FIG. 3 is a diagram illustrating an example of selecting images from an image dictionary to form a cover image.

The obtained binary segments indicate the indices of images in the dictionary, Due to the well-normalized digits in the MNIST dataset, the right images may be selected based on the indices and spliced together. FIG. 3 is a diagram 300 illustrating an example of selecting images from an image dictionary to form a cover image. As shown, the binary segments 302, 304, and 306 may be viewed as indices of images in the image dictionary 310. Consequently, images 312, 314, and 316, respectively, may be selected from the image dictionary 310. The selected images 312, 314, and 316 may then be combined to form the cover image 320. The cover image 320 shows the number "618" as the exposed semantic content but actually delivers the message "TIPS" as the hidden semantic content.

In the example above, the number of digits in the cover image 320 is determined by the length of the binary sequence. However, more digits may be added To make sure that the binary sequence can be recovered by the receiver, there may be a need to embed the sequence length into the sequence itself. For the current example, a 10-bit header may be added (i.e., 0000100000 for 32) to the 32-bit sequence, resulting in a 42-bit new sequence. Restricted by the size of the dictionary, the length of binary segments is set to its maximum, i.e., 16. Consequently, there is a need to add random bits to the sequence tail to ensure the final length is an exact multiple of 16. The lengths of the binary segment, the head and the tail are adjustable and independent of image quality. An example of adding header and tail, and corresponding binary sequence segmentation is illustrated below.

The obtained binary segments indicate the indices of images in the dictionary. Due to the well-normalized digits in the MNIST dataset, the right images may be selected based on the indices and spliced together. FIG. 3 is a diagram 300 illustrating an example of selecting images from an image dictionary to form a cover image. As shown, the binary segments 302, 304, and 306 may be viewed as indices of images in the image dictionary 310. Consequently, images 312, 314, and 316, respectively, may be selected from the image dictionary 310. The selected images 312, 314, and 316 may then be combined to form the cover image 320. The cover image 320 shows the number "618" as the exposed semantic content but actually delivers the message "TIFS" as the hidden semantic content.

Figure 4:
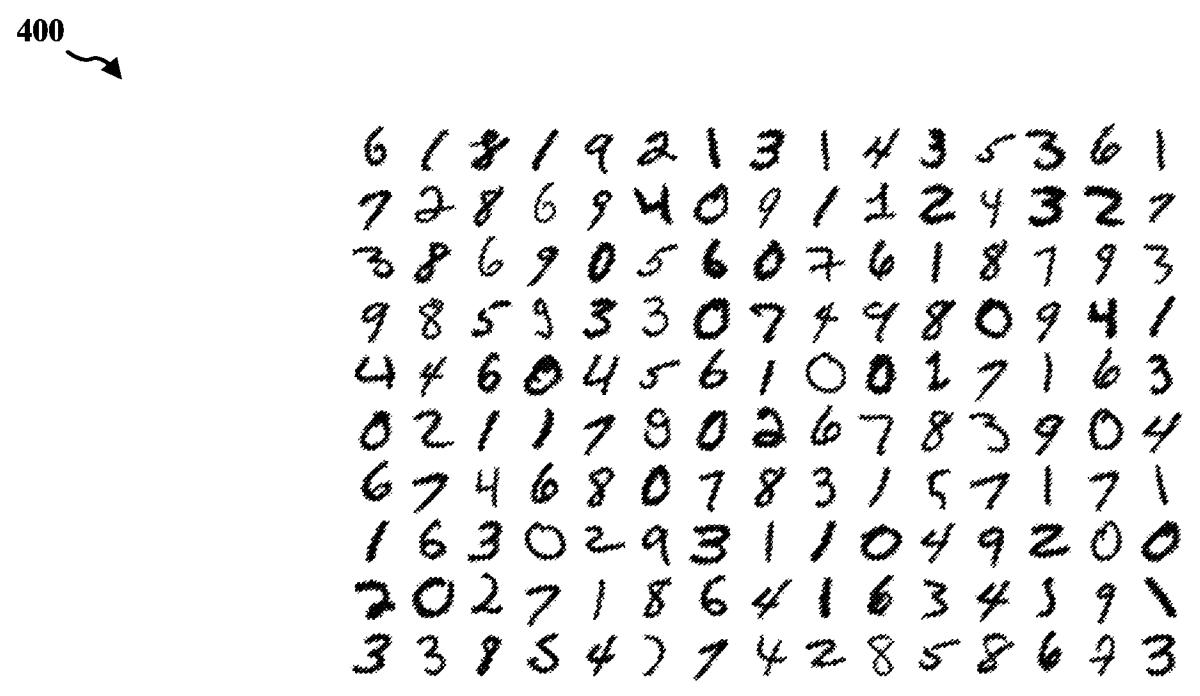

In the example above, the number of digits in the cover image 320 is determined by the length of the binary sequence. However, more digits may be added into the cover image 320 to produce a richer cover image. FIG. 4 is a diagram illustrating an example of adding random digits into the cover image 320 describe above in FIG. 3 to produce a richer cover image 400. In the example, it is known that the hidden message "TIFS" is encoded in the first three digits of the cover image 400. The other digits in the cover image 400 are randomly selected from the dictionary and have nothing embedded.

One may doubt if such a computer-processed image is suitable for image steganography because it has simple content and is easy to be identified as not natural. Furthermore, one may simply treat the use of computer-processed images as a strong sign of steganography. However, this assertion might be unfounded since computer-processed images are spreading over the Internet and have been commonly presented in daily life rather than only in steganography.

By comparing the example picture in FIG. 2 and the stego-cover in FIG. 4, it is hard to distinguish their innocence. In fact, if the key is secured, and a cryptographically strong random number generator in system is employed, there is no difference between FIG. 2 and FIG. 4 because the digits in both of them are randomly selected, and the procedures of image splicing are the same.

Even if an observer knows the steganography algorithm and gets the MNIST dataset, he can only obtain a random binary sequence by decoding a stego-cover image or an innocent example picture. Thus, it is difficult for him to identify the existence of steganography. This can be explained by the Bayes' theorem, $$P(T_0 | C) = \frac{P(C | T_0)P(T_0)}{\sum_{i=0}^{M} P(C | T_i)P(T_i)} \quad (1)$$

$$= \frac{P(C | T_0)P(T_0)}{P(C | T_0)P(T_0) + \sum_{i=1}^{M} P(C | T_i)P(T_i)}$$

where,
P(C) is the probability of observing a generated cover C,
$T_i$ denotes a task that may produce C and $T_0$ is the one using steganography.

The conditional probability, $P(T_0|C)$, is the probability of having used steganography given that C is observed. From this equation, if it is known that there exist other tasks $T_i$(M>0), and $P(C|T_i)$ is larger than 0, $P(T_0|C)$ is always smaller than 1. The larger probability the other tasks (i.e., $\sum_{i=0}^{M} P(C|T_i)P(T_i)$), the smaller the conditional probability $P(T_0|C)$. This indicates that when the generating procedure in steganography is the same as that in other tasks, the existence of steganography is hidden. On the other hand, using steganography to produce a cover C, any other tasks become suspicious of involving steganography because $P(T_0|C)$ is always larger than 0. This also reveals an important fact that the resulting confidentiality is conditional, i.e., the more frequently the system for steganography is used, the less confidential the stego-images.

The feasibility of this cover generation system for image steganography relies on the high semantic redundancy in the MNIST dataset, i.e., there are thousands of variants in different writing styles for a single digit. The feasibility of this cover generation system also relies on the clean background in the images, i.e., image synthesis by simply splicing is applicable for generating an innocuous cover. The feasibility of this cover generation system further relies on the increasing use of computer-processed images on the Internet, i.e., taking the digit images for steganography is only one of all possible purposes.

The decoding procedure is carried out by searching the right digit in the permuted dictionary. As mentioned before, the receiver can duplicate the permutation with the key and get the dictionary of the right order. For each digit image separated from the stego-cover, the distance is calculated between the digit image and each image in the dictionary. Matrices S and $D_i$ are used to denote digit images in the cover and the dictionary, respectively. The distance between the two matrices is measured by the Frobenius norm and the minimum tells the index of the right matching:

$$\arg\min_i \|S - D_i\|_F, 1 \leq i \leq N, \quad (2)$$

where N is the number of images in the dictionary.

For example, in the example described above in FIG. 3, the index of the digit image 312 in the image dictionary 310 should be 2,069, which is the decimal number of the binary segment 302. Concatenating all the binary segments and reading the head results in the right binary sequence, and then it is easy to know the message content by looking up the ASCII table.

The exposed semantic content in the images shown in FIG. 2 and FIG. 4 is an unorganized set of arbitrarily selected numbers. Frequently transmitting these meaningless images may arouse the observer's attention. Although the observer may find nothing unusual from the resulting binary sequence, the purpose of delivering such images makes themselves suspicious. One solution is delivering a visible fake message by the image at the same time, i.e., specifying the semantic content in a cover. Actually, the idea of hiding secret information under another human compilation is ancient and the most famous example should be the acrostic poems. While the chosen letters or words compose the hidden secret, a poem remains to convey some other stories. A better-organized dictionary is needed. Benefiting from the labels of the digit images in the MNIST dataset, all the images is divided into 10 classes according to the shown digit number. Table 1 below shows the distribution of different digits in the MNIST dataset. Among all the 10 digits, the digit "5" has the fewest variants, i.e., 6,313 images. Thus, the index of each digit image can represent a binary code of length at most 12 ($=\lfloor\log_2(6313)\rfloor$). Similar with the previous dictionary, the 70,000 images are permuted with a specified key. For each digit, the first 4,096 images are selected to compose a sub-dictionary. The whole dictionary has 40,960 images in use. The exposed semantic content is specified by common numbers such as year, postcode, telephone number or any other number sequence that does not need secrecy.

images in the MNIST dataset. With respect to only 10 different digits in the MNIST dataset, thousands of images representing the same meaning. This high semantic redundancy offers a high capacity to hide information. Moreover, using this redundant dataset for encoding and decoding requires all the variants of the same digit different with each other. Formally, for each digit image in transmission, its self-distance, i.e., the distance between it and its original in the dictionary, should be smaller than the distance between it and its nearest neighbour, so that the decoding procedure can find the right index. For the $t^{th}$ image in a dictionary, let $D_t$ denote the original image. $\hat{D}_t$ is the recovered image after transmission. This constraint can be expressed as $$\|\hat{D}_t - D_t\|_F < \|\hat{D}_t - D_i\|_F, 1 \leq t \neq i \leq N. \quad (3)$$

Note that the distance between two images is measured by the Frobenius norm as in Equation (2) and N is the data size. For all the images in the MNIST dataset, the ones holding this constraint are valid for a dictionary to choose. The simplest case is that the receiver gets the original digit images, i.e., $\hat{D}_t = D_t$. It is easy to know that the self-distance for each image should be 0. Distances are calculated between all possible image pairs in the MNIST dataset.

TABLE 1

Number of images in the 10 subsets of MNIST handwritten digit dataset.

| | Digit | | | | | | | | | | |
|---|---|---|---|---|---|---|---|---|---|---|---|
| | 0 | 1 | 2 | 3 | 4 | 5 | 6 | 7 | 8 | 9 | Total |
| Number of images | 6903 | 7877 | 6990 | 7141 | 6824 | 6313 | 6876 | 7293 | 6825 | 6958 | 70000 |

Figure 5:
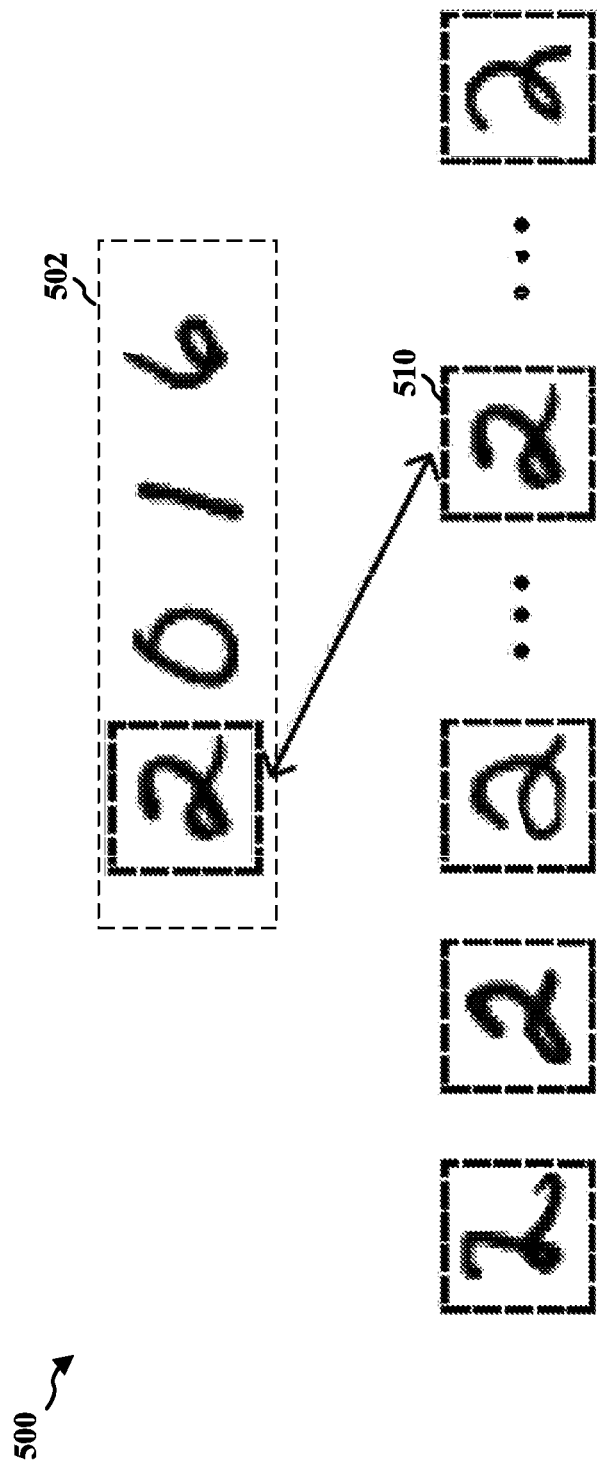
FIG. 5 is a diagram illustrating an example of specifying a semantic content in a cover image.

FIG. 5 is a diagram 500 illustrating an example of specifying a semantic content in a cover image 502. Keeping the same procedures of binary encoding and sequence segmentation as the previous example described above with reference to FIG. 3, the secret message "TIFS" is hidden into an image of "2016". Concerning the size of the sub-dictionaries, the 48-bit binary sequence is now separated to four 12-bit binary segments. To ensure that the binary sequence can be recovered by the receiver as discussed in the earlier paragraphs, the first binary segment should be "000010000001" (129), and the 130th image 510 is selected from the sub-dictionary of the digit "2". After collecting images for all the related digits, a synthesized image 502 is produced as shown in FIG. 5. The idea of specifying the exposed semantic content can be regarded as presenting a less suspicious message on the cover to mislead the observer's attention.

In various embodiment of the disclosure, the cover generation system eliminates the detectability of steganography in a completely different way. The encoding procedure is dictionary-based so that the generative model causes no modification to the images in the MNIST dataset. The system adopts an existing image generation approach so that the use of steganography hides behind other possible applications (see Equation (1)). This is akin to linguistic steganography that operates on human languages and hides itself by making stego-texts of normal meaning and grammaticality. The high redundancy in semantic patterns allows information to be encoded. Moreover, operating on semantic content rather than low-level LSB components makes the generated images resistant to post-processing procedures like lossy compression, image scaling, or image noise.

Each image generated by some embodiments is composed of some digit images from the dictionary, e.g., of the 70,000

Figure 6:
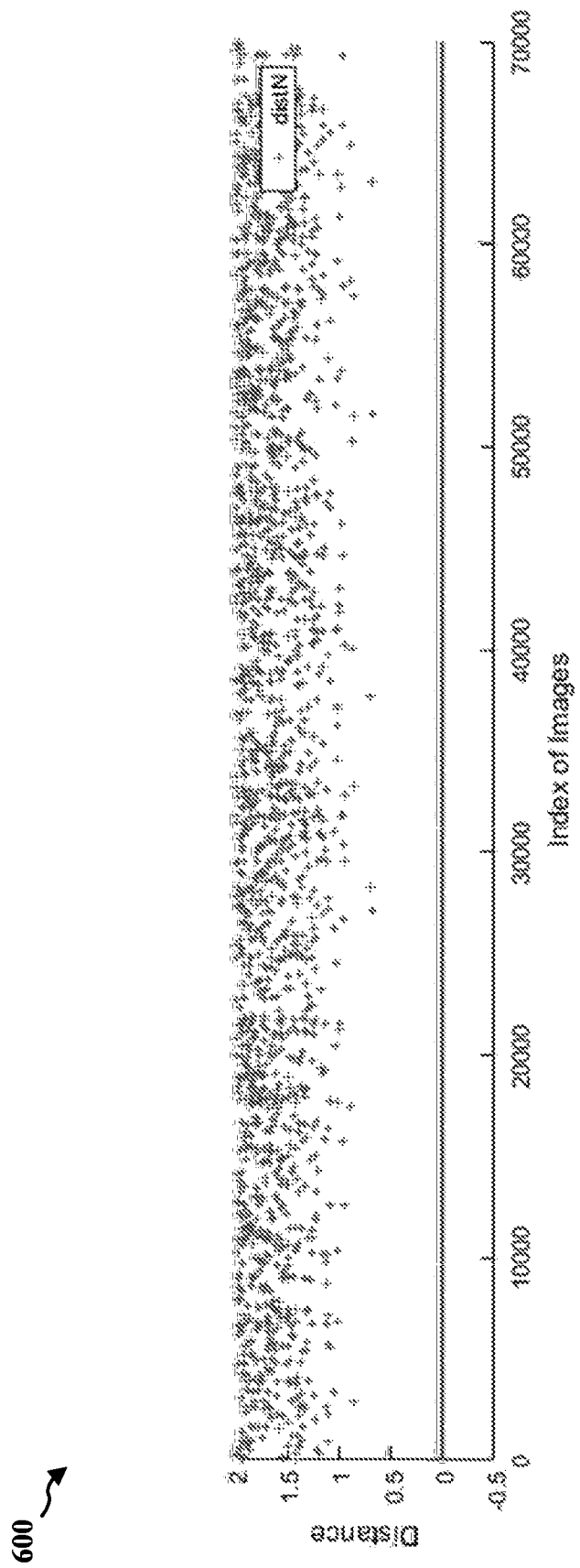
FIG. 6 is a chart illustrating the self-distance and the distance to its nearest neighbour for each of the 70,000 images in the MNIST dataset.

FIG. 6 is a chart 600 illustrating the self-distance and the distance to its nearest neighbour for each of the 70,000 images in the MNIST dataset. Pixel values of all the 8-bit grayscale images are normalized to the range [0, 1] (i.e., divided by 255) before computing the distances. All the distances to their nearest neighbours are larger than the self-distances so that the receiver can distinguish an image from the others. In other words, all the images in the MNIST dataset are resistant to lossless transmission.

However, transmission loss always exists, either by compression for the sake of fast communication or due to artificial modification by a third party, e.g., an observer. Classical image steganography techniques using LSB embedding are vulnerable to lossy transmission; hidden information may be lost because of simple image processing on the stego-image. Therefore, having no post-processing on the stego-image may be a fundamental assumption for traditional steganography techniques. For example, lossy compression, image binarization, or image scaling (downsampling and upsampling) makes the transferred image irreversible and breaks the hidden message. In contrast, in some embodiment, the cover generation system working on semantic content avoids this restriction and shows robustness to lossy transmission. According to FIG. 6, the proportion of images is show to satisfy the inequality (Equation (3)) as the statistic to evaluate the resistance of the MNIST dataset against different image processing operations. The proportion is shown with respect to the resistance of a dataset as dataset resistance and that to the resistance of a dictionary as dictionary resistance. Apparently, for lossless transmission, the dataset resistance of the MNIST dataset is 100% since the inequality holds true for all the images in the MNIST dataset. Thus, all possible dictionaries based on this dataset have resistance of 100% as well.

JPEG is the most commonly used format for digital image storage and transmission. This classical lossy compression scheme controls compression loss by the image quality factor.

FIG. 7A is a diagram 700 illustrating an example of compressed images with different JPEG compression quality. In this example, the image distance is measured between a compressed image with all the images in the MNIST dataset. FIG. 7A shows that the distance between the original file and the compressed file increases (i.e., the self-distance) when the image quality declines.

In one example where the decoding procedure is based on nearest-neighbour searching, some embodiments may be able to identify the right indices for most images in the dictionary even if the image quality is reduced due to lossy compression. FIG. 7B is a chart 750 summarizing the resistance of the MNIST dataset to JPEG compression. For images with quality 25% or above, the embodiment successfully decodes them all. That means no hidden information will be lost at these compression levels. In terms of JPEG quality 5%, some images (951 images) lose their resistance to the compression.

FIG. 8A is a diagram 800 illustrating an example of an image losing its resistance to compression. For the JPEG compressed image 802 (with quality 5%) shown in FIG. 8A, its nearest neighbour is no longer its original image 804, i.e., the distance between the JPEG compress image 802 and an image 806 is even smaller than the distance between the JPEG compress image 802 and its original image 804. This violates the constraint in Equation (3), and the decoding procedure does not operate correctly. Therefore, the 951 images that lose their resistance to compression of quality 5% should not be selected to a dictionary if the generated cover image is required to be resistant to JPEG compression of quality 5%.

Binarization is the process of converting a gray-scale image to a binary image. Compared with JPEG compression, image binarization usually causes more changes to the original image so that higher compression is achieved.

FIG. 8B is a diagram 850 illustrating an example of value change due to image binarization. The original image 854 is converted to a binary image 852, and significant value changes can be seen at the edges of the digit "1", making the converted image 852 closer to another digit image 856. However, this rarely happens and the dataset resistance of the entire MNIST dataset to image binarization is 99.3129%, i.e., only 481 images lost their uniqueness after the binarization process and they can be excluded from a dictionary. Moreover, to maintain resistance to both JPEG compression and image binarization, the number of invalid images should be 1,323, i.e., the size of the union set of the 951 images vulnerable to JPEG compression and the 481 images with respect to image binarization.

Image scaling enlarges or reduces the physical size of an image by changing the number of pixels it contains. If an image is altered by image scaling during transmission, the receiver needs to recover the image size so that Equation (2) can be used to compute distances between images.

Figure 9:
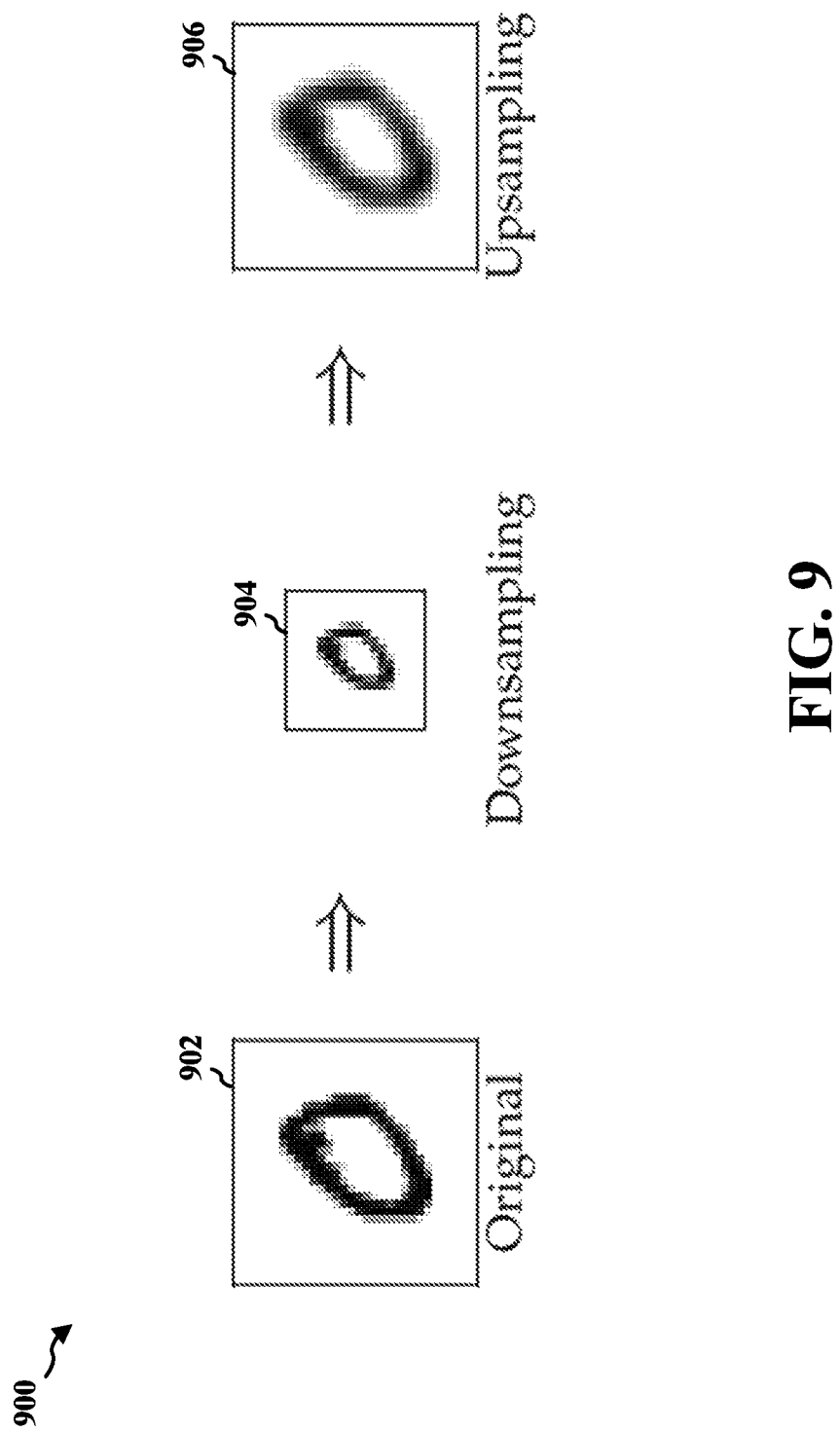
FIG. 9 is a diagram illustrating an example of image scaling on a digit image in the MNIST dataset.

FIG. 9 is a diagram 900 illustrating an example of image scaling on a digit image in the MNIST dataset. In the example, the original image 902 is first downsampled by a scaling factor $\alpha$ (e.g., ½) to obtain an intermediate image 904, and then upsampled by the reverse scaling factor $1/\alpha$ (e.g., 2). The resulting image 906 has the same size as the original image 902, but the image quality has been reduced. This may make it difficult to distinguish an image from the others in the MNIST dataset.

Figure 10A:
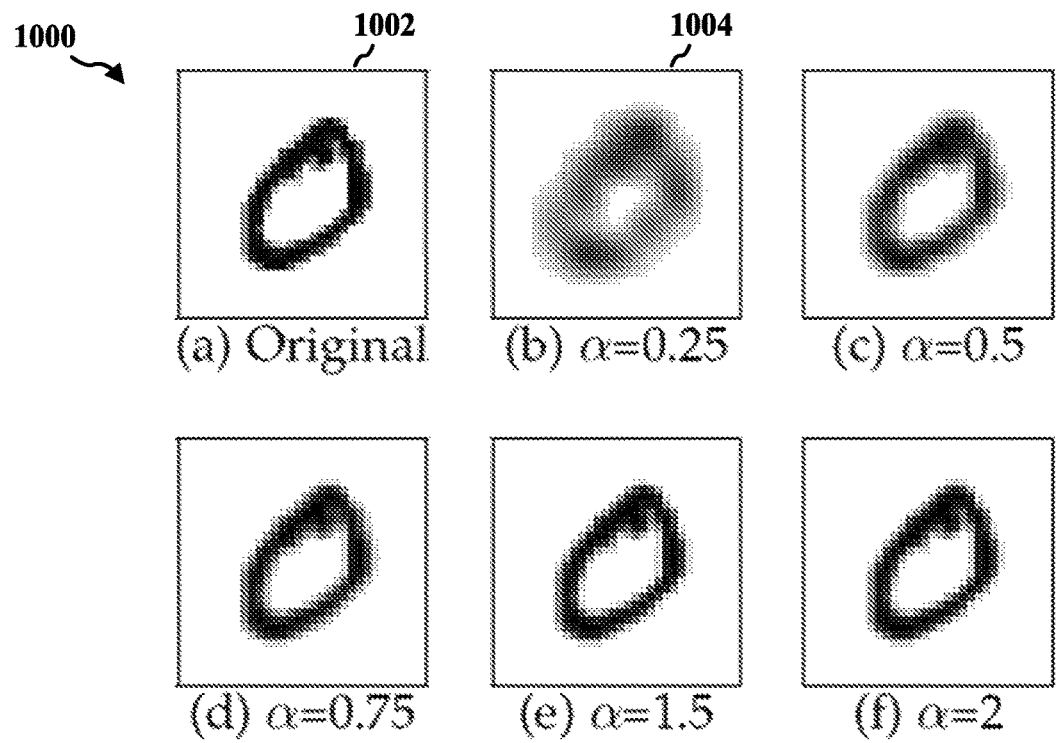
FIG. 10A is a diagram illustrating recovered images with different scaling factors.

The influence of different scaling factors to the dataset resistance can be demonstrated. FIG. 10A is a diagram 1000 illustrating recovered images with different scaling factors. The smallest scaling factor $\alpha=0.25$ brings significant blurred effect (as shown in recovered image 1004) to the original image 1002.

Figure 10B:
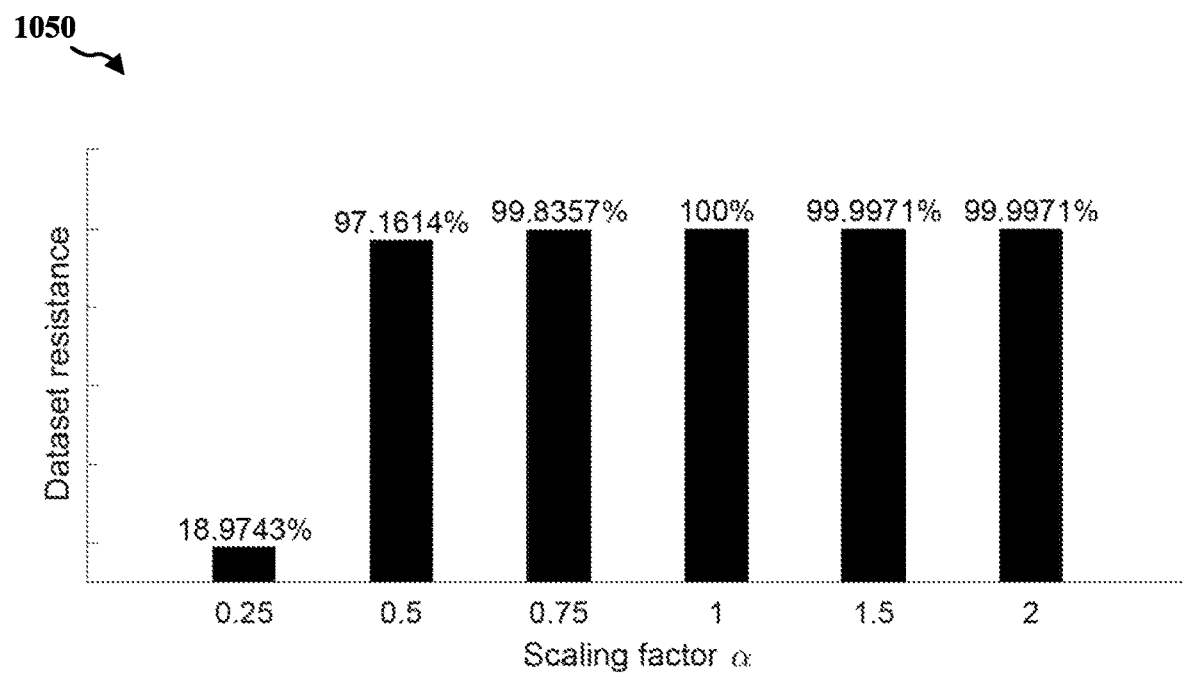
FIG. 10B is a chart illustrating the resistance of the MNIST dataset to image scaling for different scaling factors.

FIG. 10B is a chart 1050 illustrating the resistance of the MNIST dataset to image scaling for different scaling factors. As illustrated, the MNIST dataset shows considerable resistance to image scaling with a factor equal to or larger than 0.5. In contrast, downsampling the original images with a scaling factor 0.25 makes it harder for a human to recognize the digit shown in an image (e.g., the recovered image 1004) and also more difficult for a machine to find the right index of a received image (i.e., the accuracy is only 18.9743%).

Apart from the above compression techniques that may downgrade the quality of images, image noise can also corrupt the original images. In terms of image steganography, noise is probably added to a transferred image by an active attacker who intends to break the hidden information by slightly altering the stego-image. Noise reduction techniques can eliminate the influence of added noise. However, the MNIST images has shown to hold resistance to usual noise such as Gaussian white noise and salt-and-pepper noise.

Figure 11A:
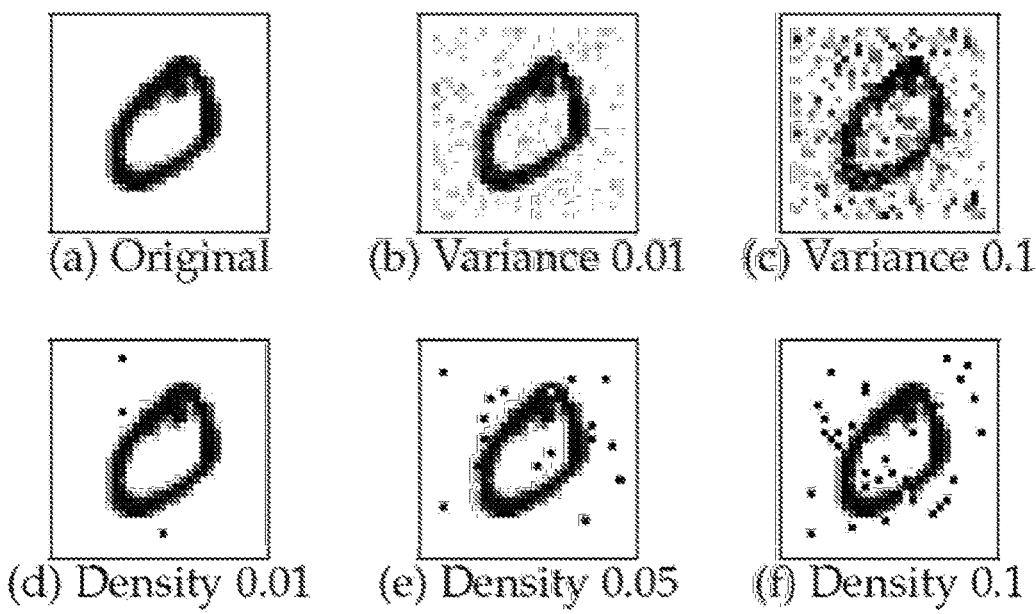
FIG. 11A is a diagram illustrating examples of noisy images with different variance or noise density.

For salt-and-pepper noise, the noise density is set to 0.01, 0.05 and 0.1, respectively. FIG. 11A is a diagram 1100 illustrating examples of noisy images with different variance or noise density. As shown, the Gaussian white noise may have variance of 0.01 or 0.1, and the noise density may be set to 0.01, 0.05, or 0.1.

Figure 11B:
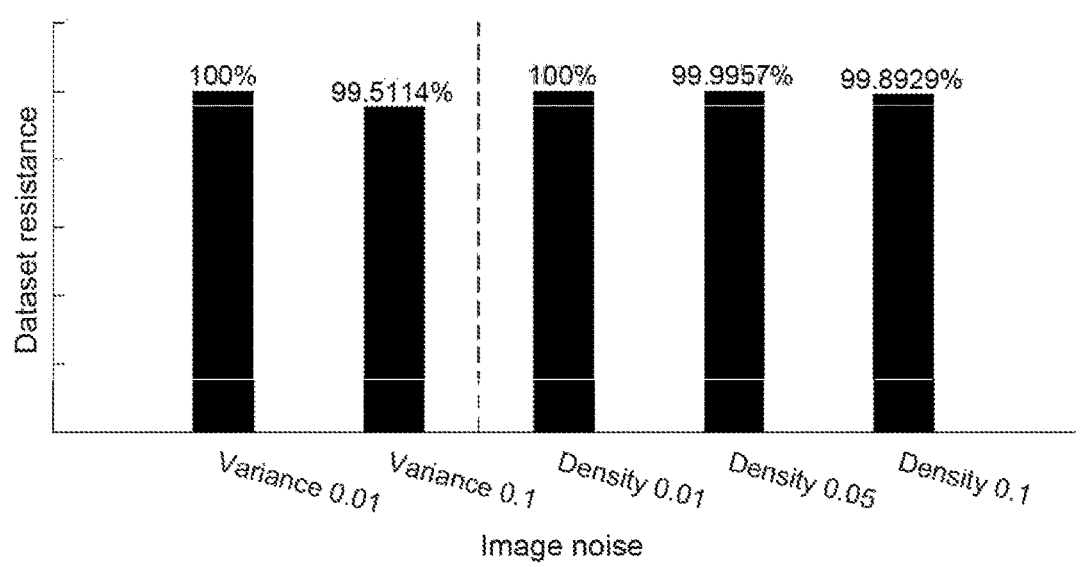
FIG. 11B is a chart illustrating the resistance of the MNIST dataset to noise of different variance or noise density.

FIG. 11B is a chart 1150 illustrating the resistance of the MNIST dataset to noise of different variance or noise density. Although the noise (e.g., Gaussian white noise with variance 0.1 in FIG. 11A) alters the original image substantially, the shape of the digit is clear as before and thus the MNIST dataset shows high resistance to the noise.

In one embodiment, a refined (MNIST) handwritten digit dataset may be obtained, which holds resistance to:

JPEG compression with quality equal to or larger than 5%;

image binarization;

image scaling with factor equal to or larger than 0.5;

Gaussian white noise with variance equal to or less than 0.1;

salt-and-pepper noise with density equal to or less than 0.1.

The refined MNIST dataset has 67,245 images and the distribution of different digits is given in Table 2 below. All dictionaries based on this refined dataset may have resistance of 100% to the above image processing operations. More post-processing operations and higher level of transmission loss can be tested for practical use, resulting in different resistant dictionaries from the example given in this disclosure.

TABLE 2

Number of images in the refined MNIST digit dataset.

| | Digit | | | | | | | | | | |
|---|---|---|---|---|---|---|---|---|---|---|---|
| | 0 | 1 | 2 | 3 | 4 | 5 | 6 | 7 | 8 | 9 | Total |
| Number of images | 6898 | 5204 | 6989 | 7141 | 6811 | 6313 | 6864 | 7259 | 6824 | 6942 | 67245 |

By examining the removed 2,755 images, 2,673 of them are of digit "1" (see Table 3 below). This is because the digit "1" has the simplest written structure among the 10 digits. The variance between different images of "1" is usually smaller than that between other digits. This can be explained by the average image entropy for each digit. According to the statistic in Table 3, the digit "1" has the smallest average entropy, indicating that these images have significantly less uncertainty than the other digits. As a result, their probability of overlapping with each other is the highest after post-processing.

TABLE 3

Average image entropy for the 10 digits in the MNIST dataset.

| | Digit | | | | | | | | | | |
|---|---|---|---|---|---|---|---|---|---|---|---|
| | 0 | 1 | 2 | 3 | 4 | 5 | 6 | 7 | 8 | 9 | Total |
| Average image entropy | 1.918 | 0.946 | 1.763 | 1.742 | 1.547 | 1.666 | 1.684 | 1.423 | 1.866 | 1.579 | 1.603 |
| Number of removed images | 5 | 2673 | 1 | 0 | 13 | 0 | 12 | 34 | 1 | 16 | 2755 |

In some embodiments, an image of handwritten alphanumerical values may be generated. Each handwritten alphanumerical value in the image may be associated with a hidden alphanumerical value, and the string of handwritten alphanumerical values may correspond to a hidden message.

In some embodiments, the dictionary of images of digits (or a codebook) may be a dataset of digits having the same background such that spliced or merged images do not have discernible or perceivable joint edges. In some embodiments, the dataset of digits may be the MNIST handwritten digit dataset.

In some embodiments, a method and system may generate an image for hiding a message based on image semantic content instead of low-level image features such as pixels. The resulted cover images hold considerable resistance to image processing operations such as JPEG compression, image binarisation, image scaling, and image noise. This enables the method and system to produce images for many other non-steganography purposes, and to produce images as natural as those captured by photography.

FIG. 12 is a flowchart 1200 of a method of generating a cover image for hiding a message. In some embodiments, operations of the method may include the operations described above with reference to FIG. 1. In some embodiments, the method may be performed by an apparatus (e.g., the apparatus 1302/1302' shown in FIG. 13 or FIG. 14). At 1202, the apparatus may encode the message to obtain a binary sequence. In some embodiments, the encoding of the message may be carried out by cryptography techniques.

At 1204, the apparatus may optionally modify the binary sequence by adding a header binary segment to the beginning of the binary sequence. In some embodiments, the header binary segment may embed the length of the binary sequence At 1206, the apparatus may optionally modify the binary sequence by adding a set of random bits to the end of the binary sequence to make the length of the modified binary sequence an exact multiple of a particular length. In some embodiments, the apparatus may take into account the header binary segment added at 1204 in determining the number of random bits to add to the end of the binary sequence, so that the length of the modified binary sequence is an exact multiple of the particular length.

At 1208, the apparatus may obtain a plurality of binary segments of the particular length based on the binary sequence. In some embodiments, the plurality of binary segments may be obtained based on the modified binary sequence.

At 1210, for each binary segment of the plurality of binary segments, the apparatus may select an image of a semantic content from a dictionary of images of random semantic contents based on the binary segment. In some embodiments, each image in the dictionary may correspond to a binary segment of the particular length. In some embodiment, the images of random semantic contents in the dictionary may have the same background so that edges of the selected images merge naturally when the selected images are combined.

In some embodiments, the images of random semantic contents in the dictionary may be permutated based on a specified key. Each image in the dictionary may be associated with its corresponding binary segment of the particular length according to the order of the images of random semantic contents in the dictionary after the permutation.

In one embodiment, each binary segment of the plurality of binary segments may be mapped to a predetermined semantic content based on the position of the binary segment in the binary sequence. In such an embodiment, to select the image for the binary segment, the apparatus may select an image of the predetermined semantic content from a sub-dictionary of the dictionary based on the binary segment. The sub-dictionary may include all images of the predetermined semantic content in the dictionary.

At 1212, the apparatus may combine the images selected based on the plurality of binary segments to form at least a portion of the cover image denoting a combination of the semantic contents of the selected images. In some embodiments, the semantic content of an image may be a numeral digit and the images of random semantic contents may be images of random numeral digits. In such embodiments, the combination of the semantic contents of the selected images may be a plurality of numeral digits.

Figure 13:
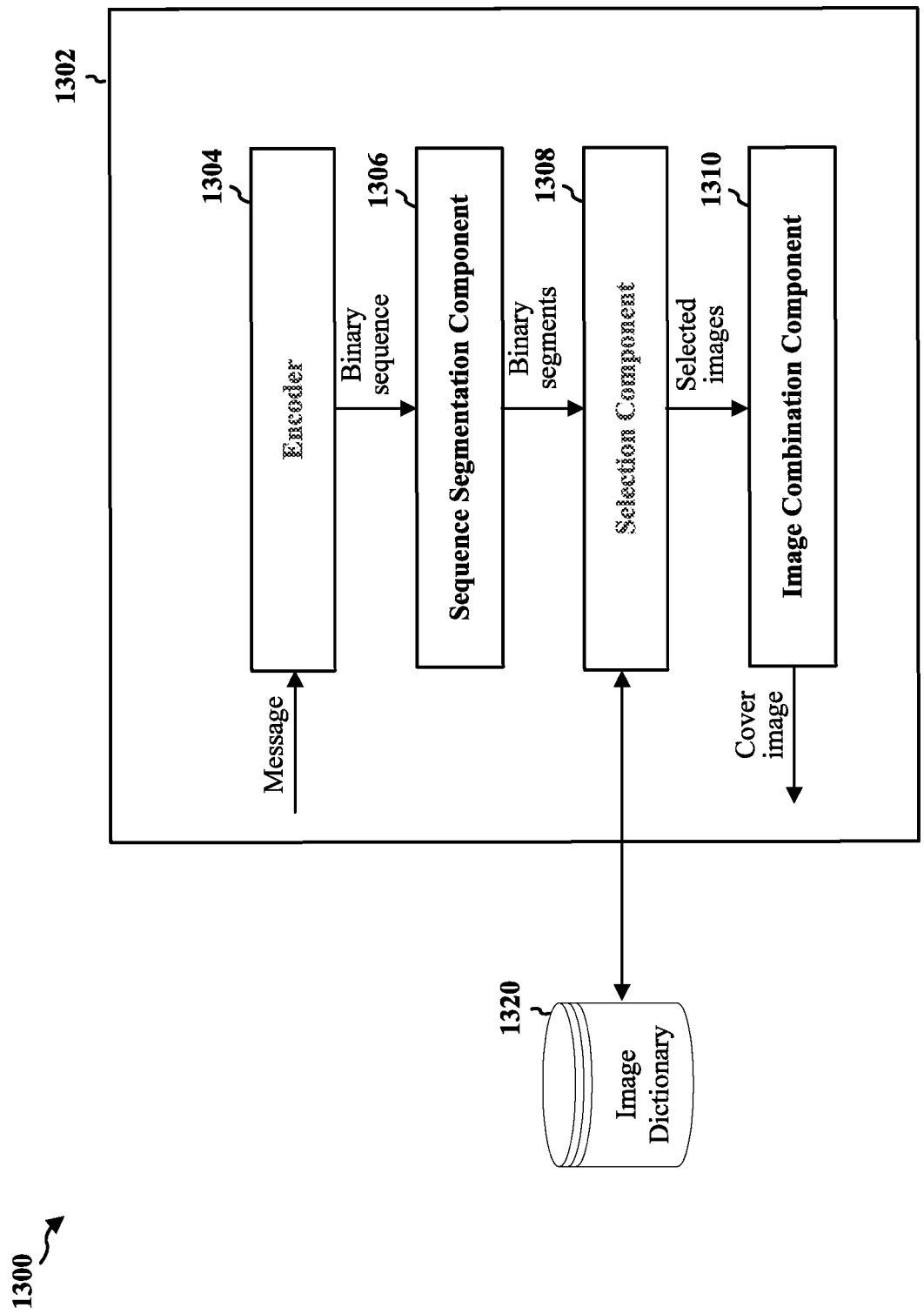
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus 1302 may be a computing device or a system including multiple computing devices.

The apparatus 1302 may include an encoder 1304 that encodes a message into a binary sequence. In one embodiment, the encoder 1304 may perform the operations described above with reference to 1202, 1204, or 1206 in FIG. 12.

The apparatus 1302 may include a sequence segmentation component 1306 that divides the binary sequence into a plurality of binary segments of a particular length. In one embodiment, the sequence segmentation component 1306 may perform the operations described above with reference to 1208 in FIG. 12.

The apparatus 1302 may include a selection component 1308 that selects an image of a semantic content from an image dictionary 1320 based on each binary segment of the plurality of binary segments. In one embodiment, the selection component 1308 may perform the operations described above with reference to 1210 in FIG. 12.

The apparatus 1302 may include an image combination component 1310 that combines the selected images to form a cover image denoting a combination of the semantic contents of the selected images. In one embodiment, the image combination component 1310 may perform the operations described above with reference to 1212 in FIG. 12.

The apparatus 1302 may include additional components that perform each of the blocks of the algorithm in the aforementioned flowcharts of FIGS. 1 and 12. As such, each block in the aforementioned flowcharts of FIGS. 1 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
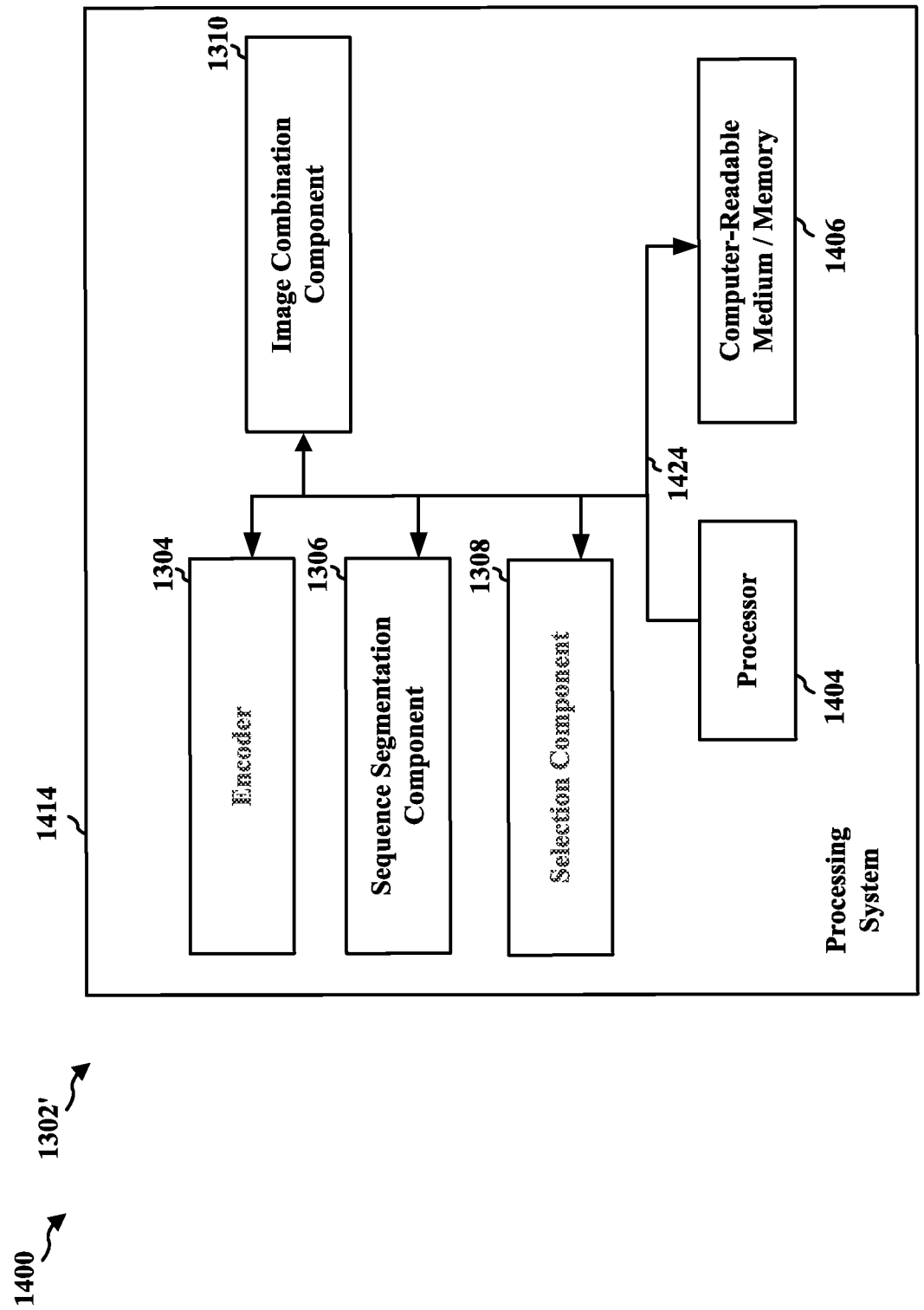
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. In some embodiments, the apparatus 1302' may be the apparatus 1302 described above with reference to FIG. 13. The apparatus 1302' may include one or more computing devices. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, and the computer-readable medium/memory 1406. The bus 1424 may also link various other circuits such as timing sources, peripherals, voltage regulators, and power management circuits, which are well known in the art, and therefore, will not be described any further.

The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310. The components may be software components running in the processor 1404, resident/stored in the computer readable medium/memory 1406, one or more hardware components coupled to the processor 1404, or some combination thereof.

In the following, various aspects of this disclosure will be illustrated:

Example 1 is a method or apparatus for generating a cover image for hiding a message. The apparatus may encode the message to obtain a binary sequence. The apparatus may obtain a plurality of binary segments of a particular length based on the binary sequence. For each binary segment of the plurality of binary segments, the apparatus may select an image of a semantic content from a dictionary of images of random semantic contents based on the binary segment. The apparatus may combine the selected images to form at least a portion of the cover image denoting a combination of the semantic contents of the selected images.

In Example 2, the subject matter of Example 1 may optionally include that each image in the dictionary may correspond to a binary segment of the particular length.

In Example 3, the subject matter of Example 2 may optionally include that the images of random semantic contents in the dictionary may be permutated based on a specified key, where each image in the dictionary is associated with the corresponding binary segment of the particular length according to the order of the images of random semantic contents in the dictionary after the permutation.

In Example 4, the subject matter of any one of Examples 1 to 3 may optionally include that the images of random semantic contents in the dictionary may have the same background so that edges of the selected images merge naturally when the selected images are combined.

In Example 5, the subject matter of any one of Examples 1 to 4 may optionally include that the apparatus may further modify the binary sequence by adding a header binary segment to the beginning of the binary sequence, and modify the binary sequence by adding a set of random bits to the end of the binary sequence to make the length of the modified binary sequence an exact multiple of the particular length, where the plurality of binary segments may be obtained based on the modified binary sequence.

In Example 6, the subject matter of any one of Examples 1 to 5 may optionally include that each binary segment of the plurality of binary segments may be mapped to a predetermined semantic content based on a position of the binary segment in the binary sequence, and to select the image for the binary segment, the apparatus may select an image of the predetermined semantic content from a sub-dictionary of the dictionary based on the binary segment, where the sub-dictionary may include images of the predetermined semantic content.

In Example 7, the subject matter of any one of Examples 1 to 6 may optionally include that the semantic content may be a numeral digit and the images of random semantic contents may be images of random numeral digits, where the combination of the semantic contents of the selected images may be a plurality of numeral digits.

A person skilled in the art will appreciate that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of generating a cover image for hiding a secret message, the method comprising:
   encoding, by a transmitter device, the secret message to obtain a binary sequence;
   obtaining, by the transmitter device, a plurality of binary segments of a particular length based on the binary sequence;
   for each binary segment of the plurality of binary segments, selecting, by the transmitter device, a digit image of a semantic content from a dictionary of images of random semantic contents based on the binary segment;
   combining, by the transmitter device, the selected images to form at least a portion of the cover image denoting a combination of the semantic contents of the selected images to create a stego-cover and transmitting the stego-cover to a receiver device over a communication network;
   initiating, by the receiver device, a decoding procedure by searching a right digit in a permuted dictionary of images by duplicating the permutation with a specified key to obtain the right order of images in the dictionary; and
   for each digit image separated from the stego-cover, calculating, by the receiver device, a distance between the digit image and each image in the dictionary, wherein the receiver device concatenates all the binary segments to obtain the right binary sequence in order to recover the secret message by looking up an ASCII table.

2. The method of claim 1, wherein each image in the dictionary corresponds to a binary segment of the particular length.

3. The method of claim 2, wherein the images of random semantic contents in the dictionary is permutated based on a specified key, wherein each image in the dictionary is associated with the corresponding binary segment of the particular length according to an order of the images of random semantic contents in the dictionary after the permutation.

4. The method of claim 1, wherein the images of random semantic contents in the dictionary have the same background so that edges of the selected images merge naturally when the selected images are combined.

5. The method of claim 1, further comprising:
   modifying the binary sequence by adding a header binary segment to a beginning of the binary sequence; and
   modifying the binary sequence by adding a set of random bits to an end of the binary sequence to make a length of the modified binary sequence an exact multiple of the particular length, wherein the plurality of binary segments are obtained based on the modified binary sequence.

6. The method of claim 1, wherein each binary segment of the plurality of binary segments is mapped to a predetermined semantic content based on a position of the binary segment in the binary sequence, wherein the selecting of the image for the binary segment comprises:
   selecting an image of the predetermined semantic content from a sub-dictionary of the dictionary based on the binary segment, the sub-dictionary comprising images of the predetermined semantic content.

7. The method of claim 1, wherein the semantic content is a numeral digit and the images of random semantic contents are images of random numeral digits, wherein the combination of the semantic contents of the selected images is a plurality of numeral digits.

8. An apparatus for generating a cover image for hiding a secret message, the apparatus comprising:
   a memory device; and
   at least one microprocessor processor coupled to the memory and configured to:
   encode, by a transmitter device, the secret message to obtain a binary sequence;

obtain, by the transmitter device, a plurality of binary segments of a particular length based on the binary sequence;

for each binary segment of the plurality of binary segments, select, by the transmitter device, a digit image of a semantic content from a dictionary of images of random semantic contents based on the binary segment;

combine, by the transmitter device, the selected images to form at least a portion of the cover image denoting a combination of the semantic contents of the selected images to create a stego-cover and transmit the stego-cover to a receiver device over a communication network;

initiate, by the receiver device, a decoding procedure by searching a right digit in a permuted dictionary of images by duplicating the permutation with a specified key to obtain the right order of images in the dictionary; and for each digit image separated from the stego-cover, calculate, by the receiver device, a distance between the digit image and each image in the dictionary, wherein the receiver device concatenates all the binary segments to obtain the right binary sequence in order to recover the secret message by looking up an ASCII table.

9. The apparatus of claim 8, wherein each image in the dictionary corresponds to a binary segment of the particular length.

10. The apparatus of claim 9, wherein the images of random semantic contents in the dictionary is permutated based on a specified key, wherein each image in the dictionary is associated with the corresponding binary segment of the particular length according to an order of the images of random semantic contents in the dictionary after the permutation.

11. The apparatus of claim 8, wherein the images of random semantic contents in the dictionary have the same background so that edges of the selected images merge naturally when the selected images are combined.

12. The apparatus of claim 8, wherein the at least one microprocessor processor is further configured to:
modify the binary sequence by adding a header binary segment to a beginning of the binary sequence; and
modify the binary sequence by adding a set of random bits to an end of the binary sequence to make a length of the modified binary sequence an exact multiple of the particular length, wherein the plurality of binary segments are obtained based on the modified binary sequence.

13. The apparatus of claim 8, wherein each binary segment of the plurality of binary segments is mapped to a predetermined semantic content based on a position of the binary segment in the binary sequence, wherein, to select the image for the binary segment, the at least one microprocessor processor is configured to:
select an image of the predetermined semantic content from a sub-dictionary of the dictionary based on the binary segment, the sub-dictionary comprising images of the predetermined semantic content.

14. The apparatus of claim 8, wherein the semantic content is a numeral digit and the images of random semantic contents are images of random numeral digits, wherein the combination of the semantic contents of the selected images is a plurality of numeral digits.

15. A non-transitory computer-readable medium storing computer executable code, comprising instructions for:

encoding, by a transmitter device, a secret message to obtain a binary sequence;

obtaining, by the transmitter device, a plurality of binary segments of a particular length based on the binary sequence;

for each binary segment of the plurality of binary segments, selecting, by the transmitter device, a digit image of a semantic content from a dictionary of images of random semantic contents based on the binary segment;

combining, by the transmitter device, the selected images to form at least a portion of a cover image denoting a combination of the semantic contents of the selected images to create a stego-cover and transmitting the stego-cover to a receiver device over a communication network;

initiating, by the receiver device, a decoding procedure by searching a right digit in a permuted dictionary of images by duplicating the permutation with a specified key to obtain the right order of images in the dictionary; and for each digit image separated from the stego-cover, calculating, by the receiver device, a distance between the digit image and each image in the dictionary, wherein the receiver device concatenates all the binary segments to obtain the right binary sequence in order to recover the secret message by looking up an ASCII table.

16. The non-transitory computer-readable medium of claim 15, wherein each image in the dictionary corresponds to a binary segment of the particular length, wherein the images of random semantic contents in the dictionary is permutated based on a specified key, wherein each image in the dictionary is associated with the corresponding binary segment of the particular length according to an order of the images of random semantic contents in the dictionary after the permutation.

17. The non-transitory computer-readable medium of claim 15, wherein the images of random semantic contents in the dictionary have the same background so that edges of the selected images merge naturally when the selected images are combined.

18. The non-transitory computer-readable medium of claim 15, the computer executable code further comprises instructions for:
modifying the binary sequence by adding a header binary segment to a beginning of the binary sequence; and
modifying the binary sequence by adding a set of random bits to an end of the binary sequence to make a length of the modified binary sequence an exact multiple of the particular length, wherein the plurality of binary segments are obtained based on the modified binary sequence.

19. The non-transitory computer-readable medium of claim 15, wherein each binary segment of the plurality of binary segments is mapped to a predetermined semantic content based on a position of the binary segment in the binary sequence, wherein the instructions for selecting the image for the binary segment comprises instructions for:
selecting an image of the predetermined semantic content from a sub-dictionary of the dictionary based on the binary segment, the sub-dictionary comprising images of the predetermined semantic content.

20. The non-transitory computer-readable medium of claim 15, wherein the semantic content is a numeral digit and the images of random semantic contents are images of random numeral digits, wherein the combination of the semantic contents of the selected images is a plurality of numeral digits.

* * * * *